Jan. 1, 1963     S. L. BARING-GOULD     3,071,012
GYRO STABILIZATION SYSTEM
Filed Sept. 3, 1959     6 Sheets-Sheet 2

FIG. 2

ROLL AXIS
PITCH AXIS

INVENTOR.
SABINE L. BARING-GOULD
BY
KENWAY, JENNEY, WITTER & HILDRETH

ATTORNEYS.

United States Patent Office 3,071,012
Patented Jan. 1, 1963
:::

3,071,012
GYRO STABILIZATION SYSTEM
Sabine L. Baring-Gould, Boston, Mass., assignor, by mesne assignments, to Northrop Corporation, Beverly Hills, Calif., a corporation of California
Filed Sept. 3, 1959, Ser. No. 837,897
39 Claims. (Cl. 74—5.34)

The present invention relates in general to new and improved gyro stabilization systems, in particular to stabilization systems which employ drift-compensated gyros.

Although all presently known gyroscopes are subject to drift, considerable progress has been made in recent years to reduce the drift rate of gyroscopes to a relatively low level. Drift rates of the order of two degrees per hour and less have been achieved both in floated and in unfloated gyros. While such drift rates are acceptable where the gyro is in continuous use during relatively short time intervals only, drift correction is ordinarily necessary where the instrument is employed for longer time periods. In the case of floated gyros, drift correction is generally accomplished by the introduction of calibrated bias torques. The calibration procedure is difficult to accomplish with the gyros in operational use and may require the delay or the interruption of normal operation. Moreover, in floated gyros the calibration is unlikely to hold true over extended time periods which include a shutdown of operation, due to the fact that cooling of the gyro during shutdown causes the viscous gyro damping fluid to solidify. The delicate endwise balance of the gyro rotor, on the inner gimbal which holds the rotor and on the hairsprings which supply power to the rotor, may be affected by such cooling and reheating of the damping fluid, with resultant solidification and of liquefaction of the fluid, to cause a change in the gyro drift rate. Accordingly, as the drift rate which can be tolerated is decreased, the cost of manufacturing a low-drift instrument becomes prohibitive, while the instrument itself becomes increasingly delicate and susceptible to damage.

Gyro drift is generally traceable either to some unbalance or to gimbal friction. The adoption of the floated gyro principle has reduced friction of the gyro inner gimbal bearings to a minimum by suspending the inner gimbal which carries the gyro rotor in a supporting medium consisting generally of a viscous damping fluid. This expedient makes possible the use of relatively frictionless jewel pivot bearings in lieu of the conventional ball bearings. Gyro drift has been further minimized through the use of servo drives for the outer gyro gimbals. In the latter case, an appropriate transducer is used to convert spin axis precession into a signal adapted to energize the appropriate gimbal erection motors. The use of such motors, however, corrects only for unbalance of the outer gimbals and for friction in the outer gimbal bearings and does not contribute to the elimination of drift due to unbalance of the gyro rotor or of the inner gimbal. As pointed out above, the problem is aggravated in the case of floated gyros wherein recurrent heating and cooling of the damping fluid can upset the delicate balance to cause gyro drift.

Gyro drift produces an erroneous precession of the rotor spin axis from a reference position. The influence of other effects, e.g. Coriolis force and earth's rotation, modify this gyro drift rate to bring about an apparent drift rate which may be greater or smaller than the drift rate due to unbalance only. These effects, however, are predictable and compensation may be introduced for them. The drift of the gyro spin axis results in an equivalent drift away from a reference position of the platform which the gyro is called upon to stabilize. In prior art devices this drift is sometimes permitted to continue; alternatively, the drift is arrested at a point of balance of all those influences, including any applied drift compensation torques, which act on the gyro rotor. In the latter case, the spin axis "hangs off" its reference position and causes the platform to do likewise.

Where gyro drift correction is introduced, a corrective torquing rate is required which is higher than the greatest anticipated random drift rate. Correction at a lower rate than the rate at which error can build up necessarily involves the loss of control of the gyro and hence, of the platform it is called upon to stabilize. At the same time, the lowest practicable corrective torquing or "slaving" rate is required, in order to render the system insensitive to spurious acceleration inputs. It is desirable therefore, to reduce gyro drift to the absolute minimum in order to have reliable gyro stabilization.

As pointed out above, while drift correction in prior art devices is possible, it is not generally automatic. Accordingly, it usually requires an interruption in the normal gyro operation with unavoidable attendant delay. In a single-degree-of-freedom gyro, precession of the rotor spin axis occurs about a single output axis which is normal to the gyro input axis. Any gyro drift then occurs about the output axis only. In order to counteract this drift, provision is made for the application of corrective currents to a torquing motor which is coupled to the inner gimbal that carries the gyro rotor and which is pivoted about the output axis. The application of the proper corrective currents will produce a torque which precisely balances the drift rate due to all the influences acting on the gyro rotor, such as unbalance, the effects of Coriolis and earth's rotation and due to predictable accelerations imposed on the gyro such as turns and change of speed. Any useful correction for these effects is impossible unless the effects responsible for drift have first been held to a minimum or have been adequately corrected. Even after the appropriate motor torquing current for drift correction has been determined, there is no assurance—particularly in floated gyros—that the gyro characteristics will remain stable. Any change in the gyro balance then results in further change in the rate of gyro drift. Some provision for the continuous and automatic monitoring of drift must therefore be considered essential in a reliable gyro stabilization system.

Accordingly, it is the primary object of this invention to provide a drift-compensated stabilization system which overcomes the disadvantages of prior art systems by continuously and automatically providing drift correction.

It is another object of this invention to provide a gyro-stabilized platform wherein the effects of gyro drift are averaged out by periodic reversals of the platform about an axis normal thereto.

It is a further object of the invention to provide a drift-compensated stabilization system which combines ruggedness and reliability with simplicity of construction.

These and other objects of the invention together with further novel features and advantages thereof will become apparent from the following detailed specification with reference to the accompanying drawings in which.

The invention which forms the subject matter of this application is organized about a gyro-stabilized platform having continuous and automatic drift correction. The platform employs two single-degree-of-freedom gyros disposed thereon with their input axes at right angles to each other so that motion about the input axes results in gyro spin axis precession from a predetermined spin axis reference position. This precession is measured about ecah gyro output axis with respect to a spin axis null position which, in turn, is referenced to the gyro case. The gyro platform itself is gimbaled about a second pair of mutually perpendicular axes. Gimbal erection motors are provided which are adapted to rotate the platform about the aforesaid second pair of axes in response to spin axis displacement from the null position. Torquing means are provided which are adapted to return each spin axis to its null position. The platform is further rotatable about a platform rotation axis which is normal to the plane determined by the aforesaid second pair of mutually perpendicular axes and parallel to one axis of each gyro, motion about which fails to produce spin axis precession. Gyro drift effects about each gyro output axis are averaged out by periodic reversals of the gyro-bearing platform about the platform rotation axis. The amplitude of platform rocking motion which occurs during such platform rotation due to the actuation of the gimbal erection motors as a result of gyro drift, is progessively reduced. It is minimized by integrating the ouput of each gyro and applying the resultant integrals in the form of bias currents to the gyro torquers. Where the plane defined by the platform is to be stabilized to a predetermined platform reference, e.g. gravity or a magnetic reference, the appropriate control signals, which are a function of deviation from the predetermined reference, are additionally applied to the gyro torquing means to update and correct the spin axis null positions, or to provide new spin axis null positions. One of the platform gimbals is pivotally disposed on the surface of the vehicle or structure it is desired to stabilize. Stabilization of the latter, or of indicating instrument mounted thereon, occurs by means of signals proportional to platform gimbal position relative to the aforesaid surface.

Figure 1A:
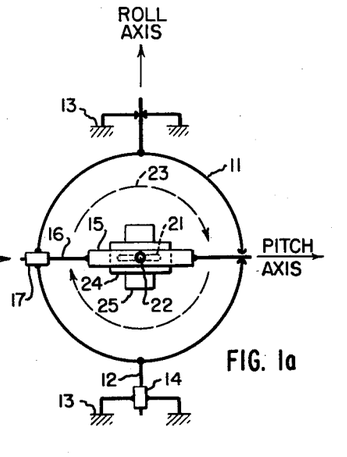
FIG. 1 illustrates in schematic form some of the aspects of a preferred embodiment of the invention.

With reference now to FIG. and specifically FIG. 1a thereof, a preferred embodiment of the invention is shown in plan view. A roll gimbal 11 is rotatably disposed with respect to an axis 12, which is referred to as the roll axis in the embodiment of the invention herein described. The roll gimbal 11 is rotatably disposed with respect to a fixed surface 13, the latter being integral with the vessel, plane, gun or other structure whose motion gives rise to the necessity for stabilization. A roll erection motor 14 is adapted to torque roll gimbal 11 with respect to surface 13. A pitch gimbal 15 is rotatably disposed about an axis 16, which is referred to as the pitch axis in this embodiment of the invention. A pitch erection motor 17 is adapted to torque the pitch gimbal 15 with respect to roll gimbal 11. A platform 21 is rotatably disposed with respect to pitch gimbal 15. A motor 18, which is omitted from FIG. 1 for the sake of clarity, has its stator positioned on the pitch gimbal 15. Motor 18 is excited from an appropriate source and has its rotor 19 coupled to platform 21 to rotate the latter at a uniform angular rate about a platform rotation axis 22, in the direction indicated by the broken line arrow 23. A pair of single-degree-of-freedom gyros 24 and 25 respectively, are mounted on the platform with their respective input axes at right angles to each other. The term "platform," as used herein, is intended to cover any rigid structure with respect to which the gyros are mounted in fixed relationship. For example, the platform may consist of a planar surface on which both gyros are mounted. In a preferred embodiment, the platform consists of a rigid elongated structure adapted to be rotated about its own axis, on which the gyros are mounted in superposed relationship.

Figure 1B:
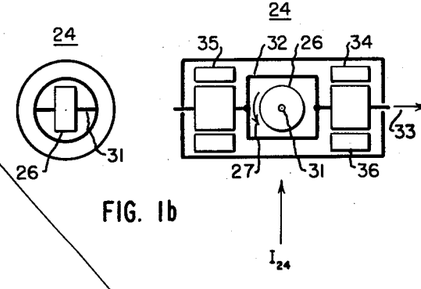
Figure 1C:
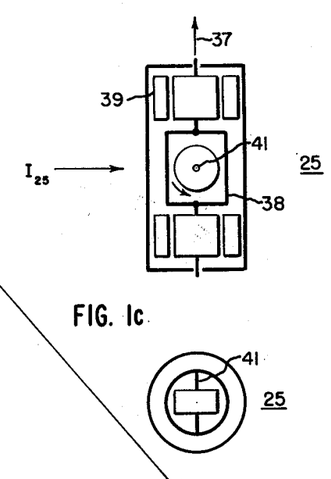

As seen from FIGS. 1b and 1c, each single-degree-of-freedom gyro is sensitive to gyro motion about a single input axis labeled $I_{24}$ and $I_{25}$ respectively in the drawing. Spin axis precession occurs about a pair of gyro output axes 33 and 37 respectively. FIG. 1b shows plan and end views respectively, of gyro 24. A gyro rotor 26 is adapted to rotate in direction 27 about a rotor spin axis 31. For the purpose of this discussion, the spin axis null position is assumed to be normal to the plane of the drawing. An inner gimbal 32 carries the rotor 26 and is rotatably disposed about the gyro output axis 33. A transducer 34, e.g. a microsyn, has its rotor coupled to gimbal 32. The transducer stator is fixed to the gyro casing and is therefore disposed in fixed relationship to the platform 21. The transducer is adapted to derive a gyro output signal which is a function of angular rotor displacement about output axis 33 and hence, it is a function of gyro rotor spin axis precession from the predetermined null position. A torquing motor 35 is coupled to the other end of gimbal 32 and is adapted to apply a force to the latter in response to an applied input signal. The above described components of the single-degree-of-freedom gyro 24 are "floated" in a container 36 which holds a liquid of predetermined specific gravity in order to decrease bearing friction, as described above.

From FIG. 1c it wil be seen that the construction of gyro 25 is identical to that of gyro 24. Gyro 25 is disposed so that its spin axis null position is normal to the plane of the drawing. Gyro rotation about input axis $I_{25}$ produces precession of the spin axis 41 about the output axis 37, which results in a corresrponding rotation of the inner gyro gimbal 38 and of the rotor of transducer 39.

Figure 2:
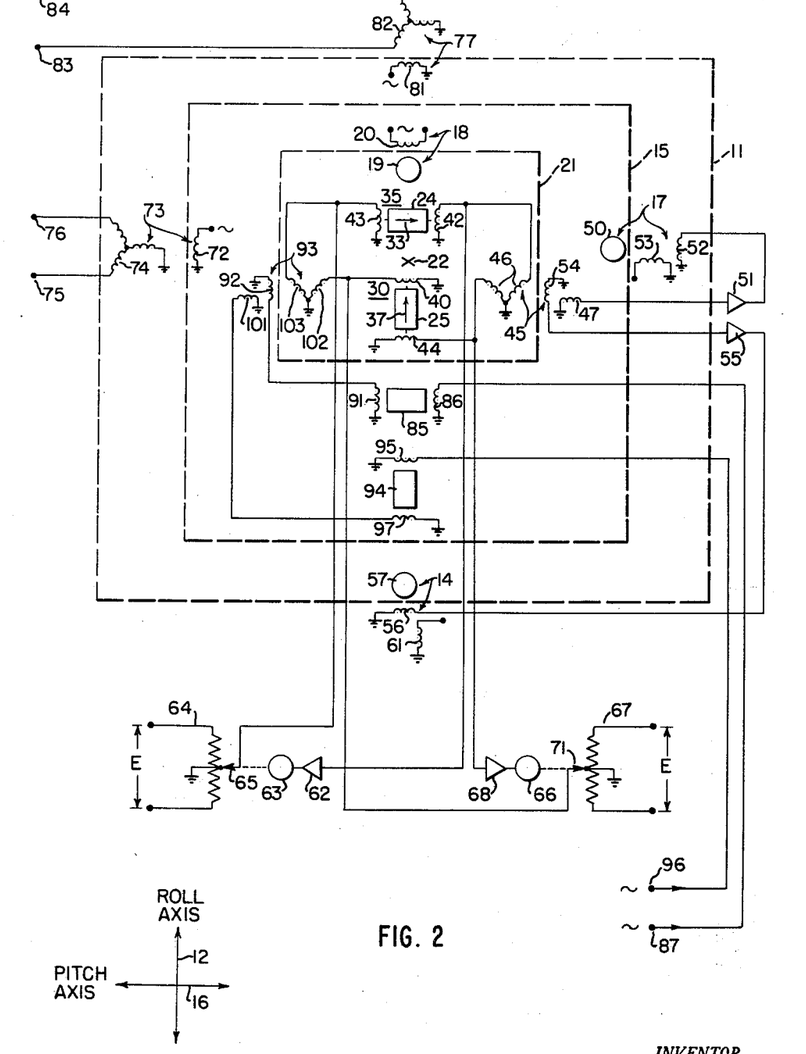
FIG. 2 is a schematic circuit diagram of the embodiment of FIG. 1.

FIG. 2 illustrates in schematic form the circuit diagram of the invention herein, applicable reference numerals having been carried forward. For the sake of clarity, the gyros herein are illustrated as being disposed in a common plane. Platform 21 is rotatably supported on pitch gimbal 15 about the axis 22 normal to the plane of the drawing. Platform rotation motor 18 has its rotor 19 coupled to the platform, while the stator 20, which is excited from a suitable power source, is disposed on pitch gimbal 15. Gyros 24 and 25 are mounted in mutually perpendicular relationship on platform 21, with their input axes at right angles to each other. Transducer 34 of gyro 24 comprises a pickoff winding 42 from which the gyro output signal is derived. Torquing motor 35 of gyro 24 comprises an input winding 43 by means of which the torquing motor is actuated. In similar manner, gyro 25 comprises a pickoff winding 44 and a torquing motor 30 which has an input winding 40. The output signals which are derived from pickoff windings 42 and 44, are applied to respective rotor windings 46 of a resolver 45. The rotor of resolver 45 is positioned on platform 21 and its stator which comprises windings 47 and 54 is located on pitch gimbal 15. The resolver stator winding 47 is connected to an amplifier 51 whose output is coupled to a stator winding 52 of pitch erection motor 17. The other stator winding 53 of motor 17 is excited from a suitable power source. As shown in schematic form in the drawing, the stator of motor 17 is positioned on roll gimbal 11, while the squirrel cage rotor 50 is mechanically coupled to pitch gimbal 15 in order to torque the latter about the pitch axis. A second stator winding 54 of resolver 45 is connected to an amplifier 55 the output of which is, in turn, coupled to a stator winding 56 of a roll erection motor 14. As in the case of the pitch erection motor, another stator winding 61 of motor 14 is excited from an appropriate power source. The stator of roll erection motor 14 is located on the aforesaid fixed surface 13, while the rotor 57 of the same motor is mechanically coupled to roll gimbal 11 in order to torque the latter about the roll axis. Gyro pickoff or transducer winding 42 is further connected directly to an amplifier 62, the output of which energizes a motor 63. A potentiometer 64 is energized from a source "E" and has a fixed center tap connected to a point of reference. A sliding tap 65 is mechanically coupled to the output shaft of motor 63 and is electrically connected to input winding 43 of the torquer 35. In similar manner, gyro transducer winding 44 is connected to an amplifier 68 whose output is adapted to energize a motor 66. A potentiometer 67 having a fixed center tap is excited from the aforesaid source "E." The variable tap 71 of potentiometer 67 is mechanically coupled to the output shaft of motor 66 and is electrically connected to input winding 40 of torquer 30. A position transducer 73, e.g. a pitch synchro, has a rotor 72 mechanically coupled to pitch gimbal 15. The pitch synchro stator 74 is positioned on roll gimbal 11, suitable terminals 75 and 76 being provided to derive output signals proportional to the angular displacement of the pitch gimbal about the pitch axis relative to the roll gimbal. A position transducer 77, e.g. a roll synchro 77, has a rotor 81 coupled mechanically to roll gimbal 11. The stator 82 of roll synchro 77 is positioned on the aforesaid fixed surface which is integral with the structure that is to be stabilized or which carries the instrument that is to be stabilized. Output terminals 83 and 84 are provided to derive signals proportional to the angular displacement of the roll gimbal relative to the fixed surface. The rotors of both synchros are excited from an A.C. source.

Where it is desired to stablize the platform to a gravity-determined reference position, a device must be provided to yield output signals responsive to deviation of the gyro platform in roll and pitch respectively from the gravity reference. In the embodiment of FIG. 2, a pitch accelerometer 85 is seen to be positioned on pitch gimbal 15. The accelerometer may take the form of a pendulum device having an excitation winding 86 excited from a suitable A.C. source 87 and further comprising a pickoff winding 91. Similarly, a pendulum-type roll accelerometer 94 is positioned on pitch gimbal 15. Accelerometer 94 has an input excitation winding 95 exicited from a suitable A.C. source 96 and further comprises a pickoff winding 97. In view of the fact that accelerometers 85 and 94 are not positioned on the rotatable platform 21 to which the gyros are affixed, the accelerometer signals must be appropriately resolved before being applied to the gyro torquers. For this purpose, a resolver 93 is provided which is positioned on the pitch gimbal. The resolver has a pair of stator windings 92 and 101 which are connected to pickoff windings 91 and 97 respectively. Rotor windings 102 and 103 of resolver 93 are connected to torquer input windings 40 and 43 respectively, and are disposed on platform 21.

The operation of the apparatus illustrated in FIGS. 1 and 2 will now be explained. Power is applied the stator winding 20 of motor 18 in order to rotate platform 21 at a uniform angular rate. In a preferred embodiment, this angular rate is approximately one revolution per minute. Smaller angular rates are satisfactory, provided the gyro drift rate does not change too rapidly. For the purpose of explanation, let platform 21 be so oriented instantaneously that gyro 24 is predominantly sensitive to roll motion and gyro 25 is predominantly sensitive to pitch motion. As seen from FIG. 2, the output axis 37 of gyro 25 points forward of the platform and the output axis 33 of gyro 24 points to the right of the platform. Any drift on the part of gyro 25, i.e. drift of the spin axis about the gyro output axis away from the spin axis null position, will then be satisfied by platform displacement about the pitch axis, e.g. by causing the forward end of the platform to be driven in an upward direction. In the absence of drift, this type of platform motion occurs when fixed surface 13 executes a dive maneuver. Accordingly, this platform motion is referred to hereafter as dive. Thus, during the interval when gyro 25 is primarily sensitive to pitch motion, the platform will be displaced by a finite amount in dive. During the next quarter revolution of the platform about axis 22, gyro 25 is predominantly sensitive to roll while its output axis, instead of pointing forward, now points primarily to the right. Any drift on the part of gyro 25 during this interval is satisfied by platform motion to the right about the roll axis. During the following quarter revolution of the platform, gyro 25 is again predominantly sensitive in pitch, but its output axis now points primarily to the rear of the platform. Here, the gyro drift is satisfied by platform motion in pitch which causes the rear of the platform to be driven upwardly corresponding to a climbing maneuver of surface 13. During the next interval the gyro is predominantly sensitive in roll. Here the gyro output axis points to the left of the platform to produce a corresponding platform roll motion which satisfies the gyro drift. Thereafter, the gyro is again sensitive in pitch and the gyro output axis points forward. Gyro 24 follows a similar sequence but lags or leads gyro 25 by 90 geometrical degrees, depending on the direction of platform rotation. In the absence of platform rotation, the continuing drift precession of the spin axis of gyro 25 away from its null position, produces a corresponding platform drift away from the platform reference position. The effect of platform rotation about axis 22, is to average out the gyro drift effects by causing the platform alternately to pitch up, roll right, pitch down and roll left during such rotation. Despite the existence of such platform rocking motion, the mean position or attitude of the platform is thereby stabilized as long as the drift rate of the gryo remains constant. If the latter changes, the amplitude of the pitching and rolling motion of the platform necessarily changes with it, but the mean platform attitude is disturbed only slightly from its previous position. Since the new drift is averaged out by the rotation of the platform, its effect will again be modulated rather than being permitted to become cumulative. It will be understood that the drift of gyro 24 is averaged out in similar fashion.

Each gyro pickoff is connected to a separate rotor winding of resolver 45 which is located on the platform 21 and which supplies thereto, in turn, signals calling for platform displacements in pitch, roll, pitch and roll respectively. The stator windings of resolver 45 are positioned on the pitch gimbal so that winding 47 receives signal contributions from both resolver rotor windings representative of platform displacement in pitch, and winding 54 receives contributions from both resolver rotor windings representative of platform displacement in roll. It is to be noted that since any errors in resolver 45 are modulated in the course of each rotation of platform 21, they, like gyro drift, are without cumulative effect on the mean position of the platform. Provided the rate of gyro dift is constant, the mean displacement of the gyro spin axis with respect to the original spin axis null position remains constant regardless of the instantaneous position or attitude of platform 21. The gyro output signals are coupled through resolver 45, whence they are amplified and applied to the pitch and roll erection motors respectively. Where drift is constant, each erection motor is actuated in turn by signals of equal amplitude and of opposite polarity during each rotation of the platform. The drift signals derived from a single gyro bring about a rocking motion of the platform about the pitch and roll axes with respect to a mean platform position. Where both gyros are subject to drift the effect is compounded, there being a 90° phase lag in the signals derived from respective gyros.

Although the rotation of platform 21 results in the averaging out of the effects of gyro drift, it is desirable to reduce the platform rocking motion to a minimum by correcting for gyro drift. To this end, the output signals derived from the respective gyro pickoffs are amplified and are applied to motors 63 and 66 which, in turn, drive the sliding taps of appropriately excited potentiometers 64 and 67 respectively. Inasmuch as each motor output shaft position represents the integral of the input signal applied to the motor, the signals obtained from the sliding taps which are applied to respective torquer input windings 43 and 45, represent the integral of the gyro output signals. As will be explained below, these signals are a true measure of gyro drift. Accordingly, the torque due to each signal which is thus applied by the torquer to its respective gyro rotor, acts to null out gyro drift.

Although, ideally, motion of the structure incorporating the surface on which roll gimbal 11 is mounted is without effect on the attitude of the gyro platform 21, the effects of friction and unbalance in the platform gimbals which are not eradicated by the servo action of the gimbal erection motors produce platform displacement from the platform reference position which is moduated by the rotation of the platform axis 22. This disturbance of the platform is expressed in gyro spin axis precession from the null position which changes, depending on the instantaneous platform position about axis 22. Thus, if the platform of FIG. 2 should be disturbed in pitch dive and the spin axis of gyro 25 is precessed about the gyro output axis, e.g. in a clockwise direction, a signal derived from gyro pickoff 44 will be applied to stator winding 47 only. The signal on winding 47 is applied to the pitch erection motor 17 and causes it to apply torque in the desired direction to counteract the platform disturbance. Assuming no roll disturbance during a 90° constant rate rotation of platform 21 about axis 22, the spin axis of gyro 25 will return toward its null position until it is exactly at the null position when the platform has rotated through 90° from the position illustrated in FIG. 2. At this point, no signal appears at pickoff 44. Assuming the platform has continued to hold the pitch dive attitude disturbance during the preceding 90° rotation, the spin axis of gyro 24, which previously was at its null position, will now have precessed about its gyro output axis, e.g. also in a clockwise direction. A proportional signal will thus appear at pickoff 42. Due to the motion of the resolver rotor 46 with the platform, this signal is applied to resolver stator winding 47 only, whence it causes the pitch erection motor 17 to rotate in the same direction to counteract the platform disturbance. After the platform has rotated through another 90° about axis 22, the spin axis of gyro 24 will have returned to its null position and the spin axis of gyro 25 will have precessed in a counterclockwise direction to produce a signal of opposite polarity at pickoff winding 44. The rotation of resolver rotor 46 with the platform is such that a signal is again applied to winding 47 only. The double reversal, i.e. the reversal of the angle of spin axis precession and of the resolver rotor position, assures that a signal of the same polarity is applied to the pitch erection motor which will apply torque in the same direction. Upon platform rotation through another 90°, the spin axis of gyro 25 returns to its null position and that of gyro 24 precesses in a counterclockwise direction. This again causes the pitch erection motor to apply torque in the same direction as before. In the above explanation it was assumed throughout that a platform disturbance in pitch only occurred. The process is similar for platform roll disturbances.

It is important to point out that the primary gyro function of platform stabilization is not interfered with by the gyro drift correction technique adopted herein. More specifically, the effect on the erection motors due to a disturbance of the platform in a given direction causes the motors to apply appropriate restoring forces until the platform is returned to its reference position. On the other hand, the effect on the erection motors which is assignable to gyro drift, is to actuate these motors so as to impart a rocking motion to the platform about the pitch and roll axis respectively.

As previously explained, the amplitude of the rocking oscillations is reduced by the application of corrective currents to the gyro torquers. It should be pointed out in this connection, that discrimination between the gyro signals assignable to uncorrected platform disturbance and to gyro drift respectively, occurs when the pickoff signals are integrated by the action of motors 63 and 66 respectively. Inasmuch as the signals which are due to incompletely corrected platform disturbances tend to be averaged out over a few platform revolutions, the corrective currents applied to the torquer input windings from sliding potentiometer taps 65 and 71 respectively, are almost entirely due to gyro drift. Accordingly, substantially all of the currents applied to the gyro torquers from the sliding tap potentiometers correct for spin axis precession due to drift, while spin axis precession due to platform disturbance is corrected by torques applied to the platform about the gyro input axes through the action of the erection motors.

As pointed out above, energization of each gimbal erection motor occurs from both gyro pickoffs. Due to the rotation of the platform-mounted resolver rotor 46 relative to its stator, the composite signal applied to each erection motor consists of contributions from both pickoff signals. These signals are modulated in accordance with the aforesaid platform rotation so that signals calling for pitch and roll motion respectively, are applied to the proper erection motors. The pitch erection motor acts in response to input signals received from winding 47 to rotate pitch gimbal 15 relative to roll gimbal 11 about axis 16. The roll erection motor responds to signals received from winding 54 to rotate the roll gimbal relative to fixed surface 13 about axis 12. The motion of both of the aforesaid gimbals effects the position of platform 21. Whenever pitch gimbal motion occurs, pitch synchro 73 produces output signals at terminals 75 and 76 respectively, which may be used for the stabilization of the vessel or structure which incorporates fixed surface 13 on which roll gimbal 11 is mounted or, alternatively, for the stabilization of an indicating instrument mounted on surface 13. Similarly, signals are received at terminals 83 and 84 in response to roll gimbal motion relative to the aforesaid surface, which are used in conjunction with the signals derived from the pitch synchro for the aforesaid stabilizing purposes.

In the absence of an external reference, the action of the two mutually perpendicular single-degree-of-freedom gyros 24 and 25 causes platform 21 to be stabilized in space. Where the platform is to be stabilized to an external reference, in particular a gravity-determined reference position, the pendulum-type pitch and roll accelerometers of FIG. 2 are employed. Deviations in pitch and roll respectively, from a vertical which is determined by the pendulums are feed to stator windings 92 and 101 of resolver 93. The resolver rotor windings 103 and 102 which are mounted on platform 21 are respectively connected to the input windings 43 and 40 of respective torquers. Due to platform rotation relative to the pitch gimbal on which stator windings 92 and 101 are mounted, the composite signal applied to each torquer winding consists of contributions from the signals derived from both accelerometers, modulated in accordance with the platform rotation. Although the same accelerometer signals are applied to both torquers, they are 90° out of phase with each other. Thus, the contribution of pitch accelerometer 85 is at a maximum when the gyro to which it is applied rotates through a position where it is primarily sensitive to motion about the pitch axis. The coupling action of resolver 93 applies in similar manner to signals derived from roll accelerometer 94. Signals are thus applied to both gyro torquers which tend to return each gyro spin axis to a gravity-determined vertical null position. Regardless of whether the latter coincides with the original null position, pickoff signals are now being derived as long as there is a spin axis displacement from the vertical.

Figure 3:
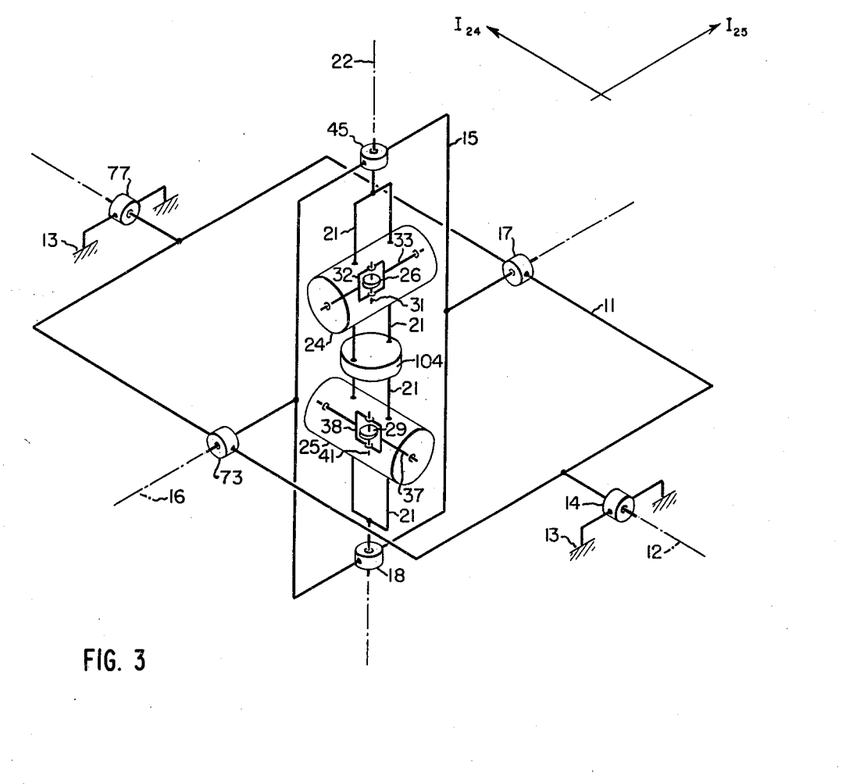
FIG. 3 is a simplified isometric view of a modification of the preferred embodiment of the invention.

FIG. 3 illustrates a modified version of a preferred embodiment of the invention, applicable reference numerals having been retained wherever possible. Platform 21 is seen to consist of an elongated supporting structure which is rotated about its own axis 22 by motor 18. Gyros 24 and 25 are mounted in superposed relationship on platform 21 with their input axes $I_{24}$ and $I_{25}$ respectively at right angles to each other. The spin axes 31 and 41 of rotors 26 and 29 respectively, are parallel to each other and normal to the plane defined by the input axes. Spin axis precession occurs about gyro output axes 33 and 37 respectively, both of which are normal to axis 22. Resolver 45 is mounted on pitch gimbal 15 with its rotor mechanically coupled to platform 21. Pitch gimbal 15 is rotatably disposed on the roll gimbal 11. A pitch erection motor 17 having its rotor coupled to the pitch gimbal, is positioned on roll gimbal 11 and is adapted to torque the pitch gimbal relative to the roll gimbal. Synchro 73 is mounted on the roll gimbal and has its rotor coupled to the pitch gimbal to provide signals proportional to pitch gimbal position about pitch axis 16. The roll erection motor 14 is mounted on fixed surface 13 with its rotor mechanically coupled to roll gimbal 11 in order to torque the latter with respect to the fixed surface. Roll synchro 77 is positioned on the fixed surface and has its rotor coupled to the roll gimbal to derive signals proportional to roll gimbal position about roll axis 12, relative to the fixed surface.

The gravity reference illustrated in FIG. 3 differs from that shown and discussed in connection with FIG. 2. In FIG. 3 a liquid level switch 104 is mounted directly on the platform so as to be rotated therewith about axis 22. This construction eliminates the necessity for the intermediate resolver 93 of FIG. 2, since the outputs of the liquid level switch can be directly connected to the gyro torquers. In operation, conduction between the switch electrodes of the liquid level switch is determined by switch position with respect to incident accelerations. In the embodiment of FIG. 3 the switch outputs are conveniently aligned with the gyro input axes. Any deviation from a gravity-determined horizontal reference causes a change in conductivity between the switch electrodes so that the amplitude of the output currents derived is determined by the amount of deviation from the horizontal.

Figure 6:
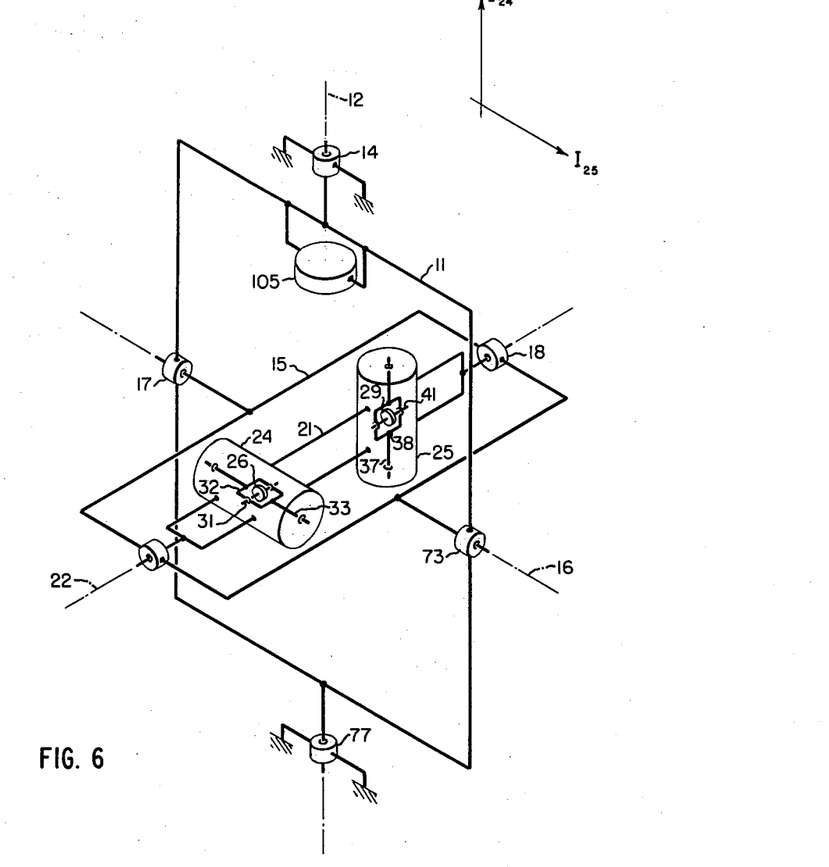
FIG. 6 is a modification of the apparatus of FIG. 3 adapted for compass use.

It will be noted that the apparatus of FIG. 3 is sensitive to gyro drift only insofar as it affects deviations of the plane defined by the mutually perpendicular gyro input axes from a gravity-determined horizontal position. Any displacement of surface 13 in azimuth about axis 22 is undetected. This lack of sensitivity in azimuth may be overcome and the apparatus of FIG. 3 may be adapted for compass use by operating the system in a position rotated through 90° about axis 16. This arrangement is illustrated in FIG. 6 with liquid level switch 104 omitted. In this embodiment gimbal 15, together with platform axis 22, is disposed in a horizontal position, while gimbal 11 is positioned upright. Rotation of platform 21 about axis 22 is maintained as before in order to compensate for gyro drift. Axis 22 now acts in equivalent manner to compensate for gyro drift. As such, it is sensitive to motion about axis 12, the latter now being coincident with the azimuth axis. Signals derived from a magnetic reference are applied, by means of a resolver, to the torquers of both gyros in order to keep axis 22 slaved to the true or to the magnetic north. Simultaneously, signals from a gravity reference 105, e.g. mounted on gimbal 11, are applied by means of the same resolver to the gyro torquers in order to maintain axis 22 level about axis 16. In this embodiment, the function of motor 14 is to provide azimuth positioning of gimbal 11 about axis 12, while motor 17 is adapted to maintain gimbal 15 in a level position.

Figure 4:
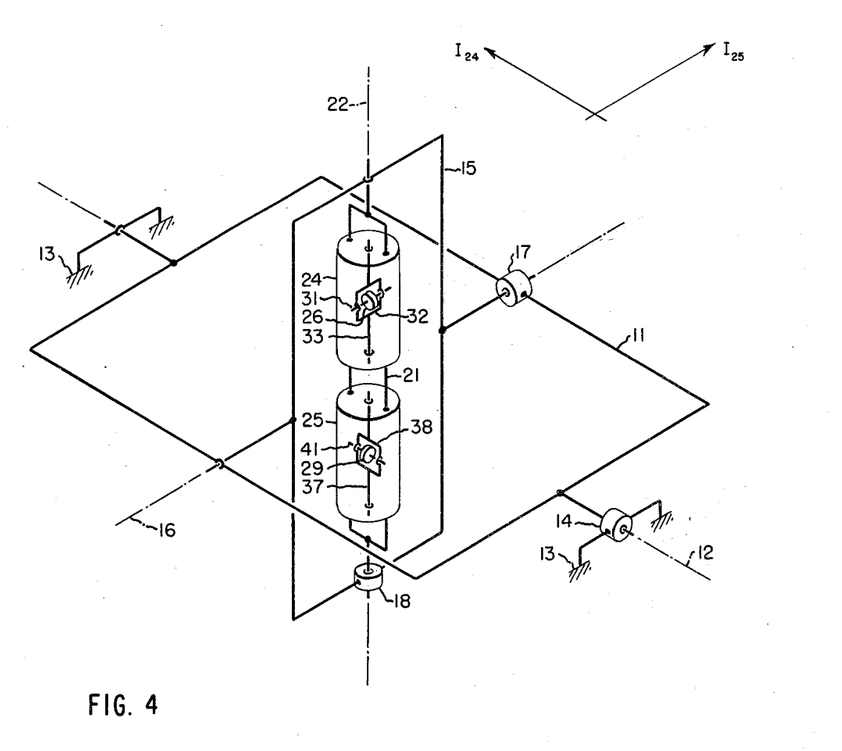
FIG. 4 illustrates in simplified form another embodiment of the invention.

The drift compensation principle discussed above is applicable as long as rotation of the gyro-carrying platform occurs about an axis which is at least parallel (if not coincident) to a non-responsive axis of each single-degree-of-freedom gyro. A non-responsive gyro axis is defined as an axis about which gyro motion produces no spin axis precession. This is either due to the fact that the gyro is insensitive to motion about this axis, or is constrained from responding due to its single-degree-of-freedom construction. In the embodiment of FIG. 3, the non-responsive gyro axis about which platform rotation occurs is the gyro spin axis. FIGURE 4 illustrates in schematic form a drift-compensated gyro system wherein platform rotation occurs about the gyro output axes 33 and 37 respectively. Applicable reference numerals have been retained in FIG. 4 and, for the sake of simplicity, all position transducers together with the gravity reference have been omitted from the drawing. It will be noted that gyro input axes $I_{24}$ and $I_{25}$ are again at right angles to each other and define the plane of the platform. The spin axes 31 and 41 of gyro rotors 26 and 29 respectively, instead of being parallel, are now disposed at right angles to each other parallel to the aforesaid plane. Gyros 24 and 25 are mounted on platform 21 which is driven about axis 22 by motor 18 in order to obtain gyro drift compensation. Platform rotation occurs about the gyro output axes, which are non-responsive axes within the definition given above.

In similar manner to that shown in FIG. 6, the apparatus of FIG. 4 may be converted to a compass system, by rotating through 90° about axis 16 so that axis 12 becomes the azimuth axis. In the latter case, gimbal 15 is operated in a level position, while gimbal 11 is positioned upright. With the proper magnetic and gravity reference signals applied to the gyro torquers by means of a resolver, axis 22 again acts as the north-seeking armature of a compass by rotation about azimuth axis 12. Rotation about axis 16 again acts to maintain axis 22 level.

Figure 5:
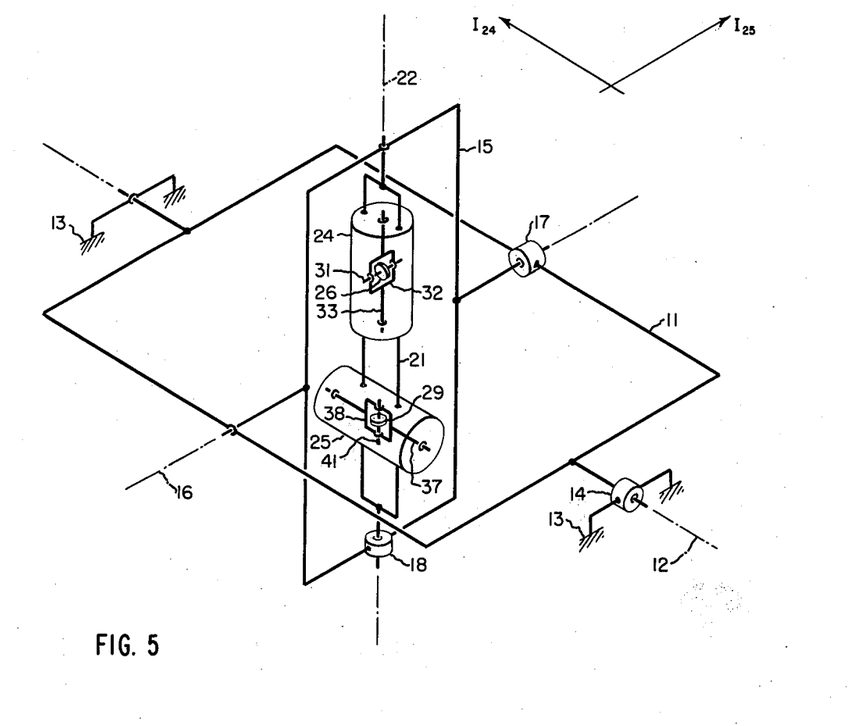
FIG. 5 illustrates a further embodiment of the invention which combines some of the features of the embodiments of FIGS. 3 and 4.

FIG. 5 illustrates in simplified form a further embodiment of the invention, applicable reference numerals having again been retained. In this embodiment, the gyros are so mounted on platform 21, that platform rotation about axis 22 causes gyro 24 to be rotated about its output axis 33, while gyro 25 is rotated about its spin axis 41. In either case, since both of these axes are non-responsive axes, platform rotation about axis 22 has no effect on the gyros beyond compensating for gyro drift.

As in the case illustrated in FIG. 6, operation of the apparatus of FIG. 5 as a compass may be accomplished with gimbal 15 held level and with gimbal 11 in a vertical position. Rotation about axis 22 is maintained for the purpose of drift compensation, axis 22 itself acting as a compass armature under the influence of the proper magnetic and gravity references.

It will be readily understood that many modifications of the basic invention herein are possible, without departing from the spirit and scope thereof. For example, the platform rotation axis and the non-sensitive gyro axes need not be coincident as long as they are parallel. To this end, the platform may consist of any desired supporting structure. For example, in the embodiment illustrated in FIG. 3 a horizontal planar surface may be employed which is rotated about axis 22 normal thereto. The gyros may be spaced from each other on the platform with a non-sensitive axis of each gyro parallel to axis 22.

Rotation of the platform about axis 22 at a uniform rate is not required in order to bring about gyro compensation. As previously explained, platform reversals about axis 22 are required in order to compensate for gyro drift. Thus, motor 18 could readily include a rocking arm on its output shaft adapted to oscillate platform 21 through a 180° angle in order to obtain the desired drift compensation.

The types of motors, potentiometers and transducers described above were chosen from a purely practical point of view without intending to limit the invention.

Numerous substitutions of these units may be carried out within the scope of this invention. Similarly, many different kinds of gravity-sensitive devices exist which could be employed herein. Thus, a pendulum-type device is practical where the latter is to be mounted on the pitch gimbal. In the embodiment of FIG. 3 a liquid level switch is shown which dispenses with the requirement for an additional resolver. In general, it may be stated that any type of accelerometer will be suitable for the present purpose.

As shown in FIG. 2, integration of the pickoff signals is provided prior to their resolution for application to the torquing motors. In certain applications, such integration may be dispensed with because of the elimination of the cumulative effects of drift in the apparatus herein described. If necessary, integration of the accelerometer or level switch signals can be added. However, because of the ability of the system herein described to evaluate and in large measure to correct for the effects of gyro drift, the latter is generally dispensed with in favor of integration performed with high precision by the gyroscopes themselves.

With low gyro torquing rates, the effects of the earth's rotation, Coriolis force and changes of latitude become important. One of the major advantages of the system herein is that, once gyro drift has been correctly compensated, the gyro precession rate accurately reflects an input torquing current. Corrective torques may thus be readily introduced to offset the above-named effects. The appropriate settings may be made manually. Alternatively, these settings may be introduced automatically in response to data available as output from a dead-reckoning computer or such other navigation equipment as may be available.

In the present invention, the introduction of precise corrections is not necessary. With the effects of gyro drift minimized, no errors can arise as long as the minimum torquing rate is higher than the combined error rate consisting of the earth's rotation effects, Coriolis effects, uncompensated drift effects due to change of gyro drift and uncompensated effects of turn and linear accelerations. It should be noted here that the effects of turn and linear accelerations are also minimized as a consequence of integration at low torquing rates. Hang-off of the gyro spin axis from the stabilized null position, e.g. the gravity-determined vertical reference position, occurs at the point where the above effects in degrees per minute, exactly balance the gyro torquing rate. Where gyro drift is large and it is necessary to accept a wide proportional region and high torquing rates about a gravity-determined vertical, hang-off may be substantial. In the present invention such errors are reduced to negligible proportions. As an example, in a 180° turn executed at a rate of 180° per minute and with a maximum gyro torquing rate of 1° per minute, an error of the order of 40′ can theoretically build up without special turn compensation or without disconnecting the gyro during the turning maneuver. With a maximum torquing rate of 5° per hour which is adequate for the compensated system herein, the error obtained as a result of the same procedure with a gyro of similar quality and without turn compensation, is reduced to a little over 3′.

The apparatus herein described is not limited to vehicle stabilization systems. The invention finds use in any gyro-stabilized system wherein drift is an important source of error. Thus, the invention has applicability in navigational systems, in gun stabilization systems, as well as in gyro-stabilized compass systems where the spin axis reference, instead of being gravity-determined is arrived at magnetically or otherwise by azimuth torquing. It will be understood that the invention is also capable of providing platform stabilization in space without recourse to another reference.

While it proves the important advantage of relative freedom from drift, as described above, the invention herein avoids the problems commonly encountered in certain low-drift gyros which must be maintained at operating temperature at all times. Accordingly, the drift-compensated gyro stabilization system which comprises the invention herein is characterized by its versatility, ruggedness and reliability, as well as its simplicity of construction.

From the foregoing disclosure, it will be apparent that numerous modifications, substitutions and equivalents will now occur to those skilled in the art, all of which fall within the true spirit and scope of the invention.

I claim:

1. A drift-compensated gyro stabilization system comprising a pair of single-degree-of-freedom gyros, mounting means adapted to carry said gyros with their input axes disposed perpendicularly to each other and with a non-responsive axis of each gyro at least parallel to a first axis, means for rotating said mounting means at a uniform angular rate about said first axis, means for rotatably supporting said mounting means about a second axis normal to said first axis, and means for rotatably supporting said last-recited means about a third axis normal to said second axis.

2. A drift-compensated gyro stabilization system comprising a pair of single-degree-of-freedom gyros, mounting means adapted to carry said gyros with their input axes disposed at right angles to each other and with a non-responsive axis of each gyro at least parallel to a first axis, each of said gyros including means for deriving an output signal proportional to displacement of the spin axis from its null position, torquing means adapted to apply a force to said spin axis about the gyro output axis, means responsive to said output signal for energizing said torquing means, means for periodically reversing the position of said mounting means about said first axis, means for rotatably supporting said mounting means about a second axis normal to said first axis, and means for rotatably supporting said last-recited means about a third axis normal to said second axis.

3. A drift-compensated gyro stabilization system comprising a pair of single-degree-of-freedom gyros, mounting means adapted to carry said gyros with their input axes disposed at right angles to each other and with a non-responsive axis of each gyro at least parallel to a first axis, each of said gyros including means for deriving an output signal proportional to displacement of the spin axis from its null position, torquing means adapted to apply a force to said spin axis about the gyro output axis, means responsive to said output signal for energizing said torquing means, means for periodically reversing the position of said mounting means about said first axis, means for rotatably supporting said mounting means about a second axis normal to said first axis, means for rotatably supporting said last-recited means about a third axis normal to said second axis, and means responsive to a deviation of said first axis from a predetermined reference position to energize said torquing means.

4. A drift-compensated gyro stabilization system comprising a pair of single-degree-of-freedom gyros, mounting means adapted to carry said gyros with their input axes disposed at right angles to each other and with a non-responsive axis of each gyro at least parallel to a first axis, each of said gyros including means for deriving an output signal proportional to displacement of the spin axis from its null position, torquing means adapted to apply a force to said spin axis about the gyro output axis, means responsive to said output signal for energizing said torquing means, means for periodically reversing the position of said mounting means about said first axis, means for rotatably supporting said mounting means about a second axis normal to said first axis, means for rotatably supporting said last-recited means about a third axis normal to said second axis, and means responsive to a deviation of said first axis from a gravity-determined reference position to energize said torquing means.

5. A drift-compensated gyro stabilization system comprising a pair of single-degree-of-freedom gyros, mounting means adapted to carry said gyros with their input axes disposed at right angles to each other and with a non-responsive axis of each gyro at least parallel to a first axis, each of said gyros including means for deriving an output signal proportional to displacement of the spin axis from its null position, torquing means adapted to apply a force to said spin axis about the gyro output axis, means responsive to said output signal for energizing said torquing means, means for periodically reversing the position of said mounting means about said first axis, means for rotatably supporting said mounting means about a second axis normal to said first axis, means for rotatably supporting said last-recited means about a third axis normal to said second axis, and means responsive to a deviation of said first axis from a magnetically determined reference position to energize said torquing means.

6. A drift-compensated gyro stabilization system comprising a pair of single-degree-of-freedom gyros, a supporting platform adapted to carry said gyros with their input axes perpendicular to each other, a non-responsive axis of each of said gyros being disposed substantially parallel to a first axis, means for periodically reversing the position of said platform about said first axis, means responsive to the precession of the gyro spin axes from their respective null positions for deriving output signals, first driving means energized by said output signals for rotating said platform about mutually perpendicular second and third axes, said second axis being disposed perpendicularly with respect to said first axis.

7. A drift-compensated gyro stabilization system comprising a pair of single-degree-of-freedom gyros, said gyros being mounted on a platform with their input axes disposed at right angles to each other, a non-responsive axis of both of said gyros being disposed substantially parallel to a first axis normal to said platform, means for rotating said platform at a uniform angular rate about said first axis, a pair of mutually perpendicular positioning axes, first driving means adapted to rotate said platform about one of said positioning axes normal to said first axis, second driving means adapted to rotate said platform about the other of said positioning axes, means responsive to the precession of each gyro rotor spin axis from its null position to derive an output signal, torquing means associated with each of said gyros adapted to apply a force to the gyro rotor about the gyro output axis, means for energizing each of said torquing means in response to the output signal derived from its associated gyro, means for coupling both of said gyro output signals to said driving means, said coupling means being adapted to modulate the amplitude of said gyro output signals in accordance with the period of platform rotation, the modulation of respective gyro output signals being effective to apply a composite signal to each of said driving means representative of platform displacement about one of said mutually perpendicular positioning axes, respective composite signals being 90° out of phase with each other.

8. The apparatus of claim 7 and further comprising a fixed supporting surface, a first gimbal mounted on said supporting surface rotatably disposed about one of said pair of positioning axes, said first driving means being adapted to rotate said first gimbal relative to said supporting surface, a second gimbal mounted on said first gimbal rotatably disposed about the other of said pair of positioning axes, said second driving means being adapted to rotate said second gimbal relative to said first gimbal, means mounted on said second gimbal responsive to deviation from a gravity-determined reference to derive a pair of signals proportional to acceleration about respective ones of said positioning axes, means for coupling each of said last-recited signals to respective ones of said gyro torquing means, said coupling means being adapted to modulate the amplitude of said last-recited signals in accordance with the period of platform rotation, said modulation being effective to apply corresponding composite signals to said torquing means which are 90° out of phase with each other.

9. The apparatus of claim 7 and further comprising a fixed supporting surface, a first gimbal mounted on said supporting surface rotatably disposed about one of said pair of positioning axes, said first driving means being adapted to rotate said first gimbal relative to said supporting surface, a second gimbal mounted on said first gimbal rotatably disposed about the other of said pair of positioning axes, said second driving means being adapted to drive said second gimbal relative to said first gimbal, said supporting surface being integral with a structure whose roll and pitch axes respectively coincide with said positioning axes, means for deriving a roll correction signal proportional to rotational displacement of said first gimbal with respect to said surface, means for deriving a pitch correction signal proportional to rotational displacement of said second gimbal with respect to said first gimbal, and means for stabilizing said structure with said roll and pitch correction signals.

10. The apparatus of claim 7 and further comprising a fixed supporting surface, a first gimbal mounted on said supporting surface rotatably disposed about one of said pair of positioning axes, said first driving means being adapted to rotate said first gimbal relative to said supporting surface, a second gimbal mounted on said first gimbal rotatably disposed about the other of said pair of positioning axes, said second driving means being adapted to drive said second gimbal relative to said first fiimbal, said supporting surface being integral with a structure whose roll and pitch axes respectively coincide with said positioning axes, an indicating instrument mounted on said supporting surface, means for deriving a roll correction signal proportional to rotational displacement of said first gimbal with respect to said surface, means for deriving a pitch correction signal proportional to rotational displacement of said second gimbal with respect to said first gimbal, and means for stabilizing said indicating instrument with said roll and pitch correction signals.

11. The apparatus of claim 7 and further comprising means mounted on said platform responsive to displacement of said first axis from a predetermined reference position to derive a pair of signals responsive to platform displacement about respective axes of said platform positioning axes, and means for energizing said torquing means with said last-recited signals.

12. The apparatus of claim 11 wherein said first axis coincides substantially with the azimuth axis of said platform, said positioning axes substantially coinciding with the platform roll and pitch axes respectively.

13. The apparatus of claim 11 wherein one of said positioning axes coincides substantially with the azimuth axis, said first axis being adapted to remain level and in predetermined relationship to the earth's magnetic field.

14. The apparatus of claim 8 wherein said platform comprises a supporting structure aligned with said first axis, said gyros being mounted at right angles to each other on said supporting structure with their non-responsive axes coinciding with said first axis.

15. The apparatus of claim 11 wherein said platform comprises a planar surface, said gyros being mounted at right angles to each other on said surface with their non-responsive axes spaced from said first axis.

16. The apparatus of claim 11 wherein the non-responsive axis of each of said gyros coincides with the gyro rotor spin axis.

17. The apparatus of claim 11 wherein the non-responsive axis of each of said gyros coincides with the gyro output axis.

18. The apparatus of claim 11 wherein the non-responsive axis of one of said gyros coincides with the gyro rotor spin axis, the non-responsive axis of the other gyro coinciding with the gyro output axis.

19. A drift-compensated gyro stabilization system comprising a pair of single-degree-of-freedom gyros, supporting means adapted to carry said gyros with their respective input axes disposed at right angles to each other, the gyro spin axes in their respective null positions being disposed at least parallel to a first axis, means for periodically reversing the position of said supporting means about said first axis, means for rotating said supporting means about a second axis normal to said first axis, and means for rotating said last-recited means about a third axis normal to said first and second axes.

20. A drift-compensated gyro stabilization system comprising a pair of single-degree-of-freedom gyros, supporting means adapted to carry said gyros with their respective input axes disposed at right angles to each other, the gyro output axes being disposed at least parallel to the first axis, means for periodically reversing the position of said supporting means about said first axis, means for rotating said supporting means about a second axis normal to said first axis, and means for rotating said last-recited means about a third axis normal to said first and second axes.

21. A drift-compensated gyro stabilization system comprising a pair of single-degree-of-freedom gyros, supporting means adapted to carry said gyros with their respective input axes disposed at right angles to each other, the spin axis of one of said gyros in its null position being disposed at least parallel to a first axis, the output axis of the other gyro being disposed at least parallel to said first axis, means for periodically reversing the position of said supporting means about said first axis, means for rotating said supporting means about a second axis normal to said first axis, and means for rotating said last-recited means about a third axis normal to said first and second axes.

22. A drift-compensated gyro stabilization system comprising a pair of single-degree-of-freedom gyros each including a rotor spin axis having a predetermined null position, means for deriving gyro output signals responsive to spin axis precession from said null position, means for periodically reversing the position of said gyros about a first axis, driving means energized by said gyro output signals adapted to rotate said gyros about a pair of mutually perpendicular positioning axes, one of said positioning axes being normal to said first axis.

23. A drift-compensated gyro stabilization system comprising a pair of single-degree-of-freedom gyros each including a rotor spin axis having a predetermined null position, means for deriving gyro output signals responsive to spin axis precession from said null position, torquing means adapted to position said gyro rotors about the respective gyro output axes, means for energizing said torquing means in accordance with said gyro output signals, means for periodically reversing the position of said gyros about a first axis, driving means energized by said gyro output signals adapted to rotate said gyros about a pair of mutually perpendicular positioning axes, one of said positioning axes being normal to said first axis, means for modulating the amplitude of said gyro output signals in accordance with the instantaneous gyro position about said first axis, and means for energizing said driving means with said modulated gyro signals.

24. A drift-compensated gyro stabilization system comprising first and second single-degree-of-freedom gyros mounted on a common supporting structure with their input axes disposed at right angles to each other, a non-responsive axis of each of said gyros being disposed substantially parallel to a first axis, each of said gyros comprising means for deriving an output signal responsive to spin axis precession from its null position, means for rotating said structure at a uniform angular rate about said first axis, first and second driving means adapted to rotate said structure about a pair of mutually perpendicular positioning axes one of which is normal to said first axis, means for energizing one of said driving means with output signals derived from both of said gyros responsive to displacement of said first axis about one of said positioning axes, means for energizing the other of said driving means with output signals derived from both of said gyros responsive to displacement of said first axis about the other of said positioning axes, whereby said driving means cooperate to stabilize said first axis in predetermined relationship to the plane defined by said input axes.

25. A drift-compensated gyro stabilization system comprising first and second single-degree-of-freedom gyros mounted on a common supporting structure with their input axes disposed at right angles to each other, a non-responsive axis of each of said gyros being disposed substantially parallel to a first axis, each of said gyros comprising means for deriving an output signal responsive to the precession of its spin axis from the spin axis null position, torquing means adapted to position said gyro rotors, means for energizing each of said torquing means in accordance with said output signals, means for rotating said supporting structure at a uniform angular rate about said first axis, first and second driving means adapted to rotate said structure about a pair of mutually perpendicular positioning axes, one of said positioning axes being disposed perpendicularly with respect to said first axis, means for energizing one of said driving means with output signals derived from both of said gyros in response to displacement of said first axis about one of said positioning axes, means for energizing the other of said driving means with output signals derived from both of said gyros in response to displacement of said first axis about the other of said positioning axes, whereby said driving means cooperate to stabilize said first axis in predetermined relationship to a plane determined by said input axes.

26. A drift-compensated gyro stabilization system comprising first and second single-degree-of-freedom gyros mounted on a common supporting structure with their input axes disposed at right angles to each other, a non-responsive axis of each of said gyros being disposed substantially parallel to a first axis, each of said gyros comprising means for deriving an output signal responsive to precession of the gyro spin axis from its null position, means for integrating said gyro output seignals, torquing means adapted to position said gyro rotors, means for energizing each of said torquing means with the integral of the corresponding output signal, means for rotating said supporting structure at a uniform angular rate about said first axis, first and second driving means adapted to rotate said structure about a pair of mutually perpendicular positioning axes, one of said positioning axes being disposed perpendicular with respect to said first axis, means for energizing one of said driving means with output signals derived from both of said gyros in response to displacement of said first axis about one of said positioning axes, means for energizing the other of said driving means with output signals derived from both of said gyros in response to displacement of said first axis about the other of said positioning axes, whereby said driving means cooperate to stabilize said first axis in a predetermined relationship to a plane defined by said input axes.

27. A drift-compensated gyro stabilization system comprising first and second single-degree-of-freedom gyros mounted on a common supporting structure with their input axes disposed at right angles to each other, a non-responsive axis of each of said gyros being disposed substantially parallel to a first axis, each of said gyros comprising means for deriving an output signal in response to precession of the gyro spin axis from its null position, torquing means adapted to position said gyro rotors about their respective gyro output axes, means for energizing each of said torquing means in accordance with said output signals, means for rotating said supporting structure at a uniform angular rate about said first axis, first and second driving means adapted to rotate said structure about a pair of mutually perpendicular positioning axes, one of said positioning axes being disposed perpendicular with respect to said first axis, means responsive to displacement of said structure about one of said positioning axes for energizing one of said driving means with output signals derived from both of said gyros, means responsive to displacement of said structure about the other one of said positioning axes for energizing the other one of said driving means with output signals derived from both of said gyros, means for deriving signals in response to the displacement of said first axis about respective ones of said positioning axes relative to a predetermined reference position, means for energizing respective ones of said torquing means with both of said last-recited signals apportioned in accordance with the instantaneous rotational position of said supporting structure about said first axis, said driving means cooperating with each other to stabilize said first axis in predetermined relationship with respect to said reference position.

28. A drift-compensated gyro stabilization system comprising first and second single-degree-of-freedom gyros mounted on a common supporting structure with their input axes disposed at right angles to each other, a non-responsive axis of each of said gyros being disposed substantially parallel to a first axis, each of said gyros comprising means for deriving an output signal in response to precession of the gyro spin axis from its null position, torquing means adapted to position said gyro rotors about their respective gyro output axes, means for energizing each of said torquing means in accordance with the integral of said output signals, means for rotating said supporting structure at a uniform angular rate about said first axis, first and second driving means adapted to rotate said structure about a pair of mutually perpendicular positioning axes, one of said positioning axes being disposed perpendicular with respect to said first axis, means responsive to displacement of said structure about one of said positioning axes for energizing one of said driving means with output signals derived from both of said gyros, means responsive to displacement of said structure about the other one of said positioning axes for energizing the other one of said driving means with output signals derived from both of said gyros, means for deriving signals in response to the displacement of said first axis about respective ones of said positioning axes relative to a predetermined reference position, means for energizing respective ones of said torquing means with both of said last-recited signals apportioned in accordance with the instantaneous rotational position of said supporting structure about said first axis, said driving means cooperating with each other to stabilize said first axis in predetermined relationship with respect to said reference position.

29. In a drift-compensated gyro stabilization system, in combination at least one gyro having a rotor spin axis adapted to be stabilized in a predetermined null position, means for deriving gyro output signals in response to spin axis displacement from said null position, means for rotating said gyro at a uniform angular speed about a first axis substantially parallel to the output axis of said gyro, driving means energized by said gyro output signals adapted to rotate said gyro about a pair of mutually perpendicular positioning axes, one of said positioning axes being disposed perpendicular with respect to said first axis.

30. In a drift-compensated gyro stabilization system, in combination at least one gyro having a rotor whose spin axis is adapted to be stabilized in a predetermined null position, means for deriving gyro output signals in response to spin axis displacement from said null position, torquing means adapted to position said gyro rotor, means for energizing said torquing means in accordance with said gyro output signals, means for rotating said gyro at a uniform angular speed about a first axis substantially parallel to the output axis of said gyro, driving means energized by said gyro output signals adapted to rotate said gyro about a pair of mutually perpendicular positioning axes, one of said positioning axes being disposed perpendicular with respect to said first axis, means for modulating the amplitude of said gyro output signals in accordance with the instantaneous gyro position about said first axis, and means for energizing said driving means with said modulated gyro output signals.

31. A drift-compensated gyro stabilization system responsive to the motion of a fixed supporting surface referenced to mutually perpendicular first, second and third axes, comprising a first gimbal positioned on said supporting surface and rotatably disposed about said second axis, a second gimbal positioned on said first gimbal and rotatably disposed about said third axis, a second-axis erection motor mounted on said supporting surface and having its rotor coupled to said first gimbal to rotate the latter about said second axis, a third-axis erection motor mounted on said first gimbal and having its rotor coupled to said second gimbal to rotate the latter about said third axis, a platform positioned on said second gimbal rotatably disposed about said first axis, a first-axis rotation motor mounted on said second gimbal and having its rotor coupled to said platform, means for energizing said last-recited stator to rotate said platform at a uniform angular rate about said first axis, a pair of gyros respectively disposed with a non-responsive axis of each substantially parallel to said first axis, each of said gyros comprising a rotor having a spin axis, each of said rotors being gimbaled about a single output axis for spin axis precession from a null position in response to gyro displacement about an input axis normal to said output axis, said gyros being mounted on said platform with their respective input axes perpendicular to each other to define a plane, said spin axes being disposed in predetermined relationship to said plane in their respective null positions, each of said gyros comprising a pick-off for deriving a gyro output signal in response to spin axis precession from said null position, a first resolver having a pair of rotor windings connected respectively to said gyro pickoffs said rotor windings being positioned on said platform, said first resolver further comprising a pair of stator windings positioned on said second gimbal, means for amplifying the signals derived from said first resolver stator windings, means for applying said amplified signals to said first- and second-axis erection motors respectively, a torquer motor coupled to each of said gyro rotors adapted to position the latter about said output axis, means for amplifying said gyro output signals, a pair of sliding tap potentiometers each excited from a voltage source, a motor associated with each of said potentiometers adapted to drive the sliding tap thereof in response to the amplified output signal of one of said gyros, each of said sliding taps being connected to energize the torquer motor of its corresponding gyro, said platform being adapted to be stabilized to said plane independently of gyro drift.

32. The apparatus of claim 31 and further comprising a second-axis transducer positioned to detect relative motion of said first and second gimbals respectively, a third-axis transducer positioned to detect relative motion of said first gimbal and said supporting surface respectively, means for exciting the rotors of said transducers, and means for deriving output signals from the stators of said transducers adapted to compensate for the motion of said supporting surface.

33. The apparatus of claim 31 and further comprising a pair of gravity-sensitive accelerometers mounted on said second gimbal adapted to sense platform displacement from a gravity-determined vertical about said roll and pitch axes respectively, each of said accelerometers comprising pickoff and excitation windings respectively, each of said excitation windings being energized from a constant voltage source, a second resolver comprising a pair of stator windings positioned on said second gimbal and connected respectively to said accelerometer pickoffs, said second resolver further comprising a pair of rotor windings positioned on said platform and connected to energize respective torquer motors.

34. The apparatus of claim 33 wherein said first axis is substantially parallel to the azimuth axis of said supporting surface, said second and third axes being substantially parallel to the roll and pitch axes respectively of said supporting surface.

35. The apparatus of claim 31 and further comprising a gravity-sensitive reference positioned on one of said positioning gimbals, a magnetic reference determined by the earth's magnetic field, a second resolver comprising a pair of stator windings positioned on said second gimbal and connected to the output of said gravity-sensitive reference and said magnetic reference respectively, said second resolver further comprising a pair of rotor windings positioned on said platform and connected to energize respective torquer motors.

36. The apparatus of claim 35 wherein said third axis is substantially parallel to the azimuth axis of said supporting structure, said first axis being substantially parallel to said magnetic reference.

37. The apparatus of claim 31 wherein said gyro spin axes in their respective spin axis null positions are substantially coincident with said first axis.

38. The apparatus of claim 31 wherein the gyro output axes are substantially coincident with said first axis.

39. The apparatus of claim 31 wherein one of said gyro spin axes in its spin axis null position is substantially coincident with said first axis, the output axis of the other gyro being substantially coincident with said first axis.

References Cited in the file of this patent

UNITED STATES PATENTS

| | | |
|---|---|---|
| 2,752,793 | Draper et al. | July 3, 1956 |
| 2,912,865 | De Cremiers | Nov. 17, 1959 |
| 2,928,782 | La Hue | Mar. 15, 1960 |
| 2,936,627 | Wing et al. | May 17, 1960 |

UNITED STATES PATENT OFFICE
CERTIFICATE OF CORRECTION

Patent No. 3,071,012                                January 1, 1963

Sabine L. Baring-Gould

It is hereby certified that error appears in the above numbered patent requiring correction and that the said Letters Patent should read as corrected below.

Column 3, line 42, after "of" insert -- an --; line 45, after "FIG." insert -- 1 --; column 4, line 28, for "wil" read -- will --; column 5, line 40, for "exicited" read -- excited --; column 6, line 53, for "dift" read -- drift --; column 8, line 51, for "feed" read -- fed --; column 9, line 59, strike out "compensate for gyro drift" and insert instead -- the armature of a compass --; column 14, line 31, for "fiimbal" read -- gimbal --; column 15, line 17, for "the", first occurrence, read -- a --; column 16, line 45, for "seignals" read -- signals --.

Signed and sealed this 2nd day of July 1963.

(SEAL)
Attest:

ERNEST W. SWIDER
Attesting Officer

DAVID L. LADD
Commissioner of Patents